United States Patent Office 2,816,895
Patented Dec. 17, 1957

2,816,895

BASIC BENZILIC ESTERS AND A PROCESS OF PREPARING THEM

Gustav Ehrhart, Bad Soden, and Heinrich Ott, Eppstein, Germany, assignors to Farbwerke Hoechst Aktiengesellschaft vormals Meister Lucius & Brüning, Frankfurt (Main), Germany, a corporation of Germany No Drawing. Application November 30, 1954
Serial No. 472,259

6 Claims. (Cl. 260—294.3)

The present invention relates to basic benzilic esters, more particularly to compounds of the general formula

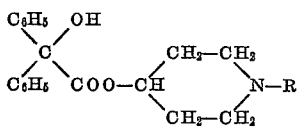

wherein R stands for alkyl radicals containing up to 4 carbon atoms, and the acid addition salts thereof, and to a process of preparing them. It is already known that dialkylamino-alkyl-esters of benzilic acid possess pharmaceutically valuable properties (U. S. Patent 2,399,736, U. S. Patent 2,461,219 and U. S. Patent 2,570,181).

Now we have found that pharmaceutically valuable benzilic N-alkylpiperidyl-(4)-esters can be produced by reacting benzilic acid and/or an ester with low molecular aliphatic alcohols of said acid with a compound of the formula

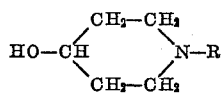

wherein R stands for alkyl radicals containing up to 4 carbon atoms. The reaction may advantageously be carried out in the presence of alcoholates.

The new compounds are distinguished as particularly good antispasmodics showing only a slight toxicity. For example the lentine spasm in isolated intestines of guineapigs was eliminated by the administration of benzilic N-methyl-piperidyl-(4)-ester. The effect as an antispasmodic was found to be about 3 times that of atropine, while the toxicity of the compounds is only ⅓ that of atropine.

The compounds obtained can be converted into the corresponding salts by means of inorganic or organic acids. As inorganic acids there may be used, for example hydrohalic acids, phosphoric acid, sulfuric acid and amidosulfonic acid, while, for instance, oxalic acid, acetic acid, lactic acid, succinic acid, maleic acid, malic acid, tartaric acid, salicylic acid, citric acid, hydroxy ethane sulfonic acid, aceturic acid, and ethylene-diamine-tetra-acetic acid may be used as organic acids.

The following examples serve to illustrate the invention but they are not intended to limit it thereto:

*Example 1*

25.6 grams of benzilic ethylester, 12 grams of N-methyl-4-hydroxypiperidine and a solution of 0.5 grams of sodium in 10 cc. of absolute alcohol are mixed; the mixture is heated for 2½ hours to 110–120° C. under a pressure of 80 mm. After cooling it is dissolved in a dilute hydrochloric acid; the clear solution is rendered alkaline with soda, during which operation the benzilic N-methyl-piperidyl-(4)-ester precipitates. The yield amounts to 22 grams, the melting point of the compound is at 164° C.; the chlorhydrate melts at 209–210° C.

*Example 2*

73 grams of benzilic methyl ester and 39 grams of N-ethyl-4-hydroxypiperidine are added to a solution of 1.5 grams of sodium in 60 cc. of absolute ethanol. The reaction mixture is heated for 5 hours to 110–120° C. under a pressure of 80 mm. and, after cooling, it is dissolved in dilute hydrochloric acid. The solution is then extracted with ether and the aqueous solution is rendered alkaline with potassium carbonate, during which operation the benzilic N-ethyl-piperidyl-(4)-ester is precipitated. The yield amounts to 50 grams; after recrystallization from diisopropylether the product melts at 93° C. The hydrochloride melts at 182° C. (after recrystallization from acetonitrile).

We claim:

1. The compounds selected from the group consisting of basic benzilic acid esters of the general formula

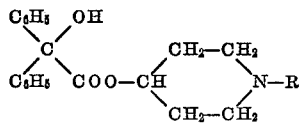

wherein R stands for alkyl radicals containing up to 4 carbon atoms, and the acid addition salts thereof.

2. The compound of the formula

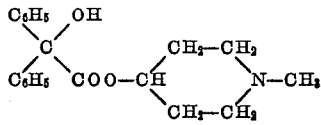

3. The compound of the formula

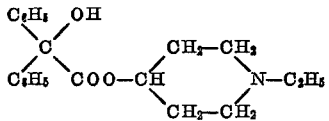

4. A process of preparing benzilic N-alkyl-piperidyl-(4)-esters which comprises reacting a member of the group consisting of benzilic acid and a lower alkyl ester of said acid with a compound of the formula

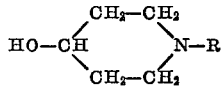

wherein R stands for alkyl radicals containing up to 4 carbon atoms.

5. An acid addition salt of the compound of claim 2.
6. An acid addition salt of the compound of claim 3.

References Cited in the file of this patent

UNITED STATES PATENTS 2,370,114   Klemme _____ Feb. 20, 1945

FOREIGN PATENTS 483,258   Great Britain _____ Apr. 14, 1938

OTHER REFERENCES

Ford-Moore et al.: Journal of the Chemical Society of London for 1947, pages 55–60.

Blicke et al.: Journal of the American Chemical Society, vol. 64, pages 428–431, 1942.

Lands: Journal of Pharmacology and Experimental Therapeutics, vol. 102, number 4, pages 219–236, 1951.